United States Patent
Schachter

(10) Patent No.: US 7,958,126 B2
(45) Date of Patent: Jun. 7, 2011

(54) TECHNIQUES FOR INCLUDING COLLECTION ITEMS IN SEARCH RESULTS

(75) Inventor: Joshua E. Schachter, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 233 days.

(21) Appl. No.: 11/642,178

(22) Filed: Dec. 19, 2006

(65) Prior Publication Data

US 2008/0147640 A1 Jun. 19, 2008

(51) Int. Cl.
*G06F 17/30* (2006.01)

(52) U.S. Cl. ..................................................... 707/748

(58) Field of Classification Search .................. 707/706, 707/708, 723, 748
See application file for complete search history.

(56) References Cited

U.S. PATENT DOCUMENTS

| | | | |
|---|---|---|---|
| 6,269,368 B1 | 7/2001 | Diamond | |
| 6,526,440 B1 | 2/2003 | Bharat | |
| 6,640,218 B1 * | 10/2003 | Golding et al. | 707/2 |
| 2003/0028520 A1 | 2/2003 | Alpha | |
| 2003/0041054 A1 * | 2/2003 | Mao et al. | 707/3 |
| 2005/0131866 A1 * | 6/2005 | Badros et al. | 707/3 |
| 2005/0262050 A1 * | 11/2005 | Fagin et al. | 707/3 |
| 2005/0289003 A1 * | 12/2005 | Thompson et al. | 705/14 |
| 2006/0026173 A1 * | 2/2006 | Amro et al. | 707/10 |
| 2006/0161524 A1 * | 7/2006 | Roy et al. | 707/3 |
| 2007/0143155 A1 * | 6/2007 | Whitsett et al. | 705/5 |
| 2007/0250498 A1 * | 10/2007 | Pedersen et al. | 707/5 |

OTHER PUBLICATIONS

"Notification of Transmittal of the International Search Report and the Written Opinion of the International Searching Authority, or the Declaration" received in corresponding PCT case, International application No. PCT/US2007/087635 dated Apr. 21, 2008, 11 pages.
Chinese Office Action received in Application No. 200780047262.1 dated Oct. 13, 2010 (19 pages).
Current Claims of Chinese Application No. 200780047262.1 dated Jan. 2011 (6 pages).
Korean Office Action received in Application No. 10-2009-7012474 dated Jan. 11, 2011 (9 pages).
Current Claims of Korean Application No. 10-2009-7012474, (4 pages).

* cited by examiner

*Primary Examiner* — Charles Kim
*Assistant Examiner* — Fatima P Mina
(74) *Attorney, Agent, or Firm* — Hickman Palermo Truong & Becker LLP

(57) ABSTRACT

Techniques are provided for including collection items in the ranked set of search results that are returned to a user in response to a search query. Collection scoring techniques are also provided for generating relevance scores for collection items in a different manner than relevance scores are generated for base items that are not collections. The collection scoring techniques may be applied to non-base collection items, base collection items, or both. Items that match the search query, including base items and collection items, are ranked in a unified ranking based on their respective relevance scores, thereby allowing searches to readily determine the relevance ranking of matching collection items relative to matching base items.

38 Claims, 2 Drawing Sheets

TECHNIQUES FOR INCLUDING COLLECTION ITEMS IN SEARCH RESULTS

FIELD OF THE INVENTION

The present invention relates to searches and, more specifically, to providing search results that include collection items.

BACKGROUND

Search engines typically execute searches against a homogenous set of items. Depending on the search engine, the homogenous set of items may be web pages, images, files, songs, videos, merchandise, etc. The type of item against which a search is executed is referred to herein as the "base type" of the search. Items that belong to the base type of a search are referred to herein as "base items".

Objects that represent collections of base items are referred to herein as "collection items". In some situations, collection items are themselves base items. For example, a "folder" is itself a file, but can also contain other files. Similarly, a web page may contain a listing of other web pages. Collection items that are base items are referred to herein as "base collection items".

When a search engine performs a search against a particular base type, the search results may include base collection items as well as base items that are not collections. For example, the results of a search for files created on a particular date may include folders created on the specified date, as well as other files. Similarly, the results of a search for web-pages related to "Manhattan hotels" may include web pages for specific Manhattan hotels, as well as web pages from travel service sites that list web pages for Manhattan hotels.

Unfortunately, such base collection items are not the only collection items that would be useful to a searcher. In many cases, collections of base items have been specified in objects that are not themselves base items. For example, a user's set of "bookmarks" corresponds to a set of web pages, yet a bookmark set is not itself a web page. Consequently, bookmark sets are not listed in search results that are executed against web pages. Similarly, a user's playlist corresponds to a set of songs, but a playlist is not itself a song. Therefore, playlists are not listed in search results of searches that are executed against songs.

Collection items that are not themselves base items are referred to herein as "non-base collection items". In some cases, the identification of relevant non-base collection items may be more useful to searchers than the identification of relevant base items. In other cases, the identification of relevant non-base collection items may be less useful than the identification of relevant base items. Therefore, it would be desirable to provide searchers with information about (a) relevant base items, (b) relevant base collection items, and (c) relevant non-base collection items, and to present the information in a manner that allows the searchers to determine the relative relevance of the various items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
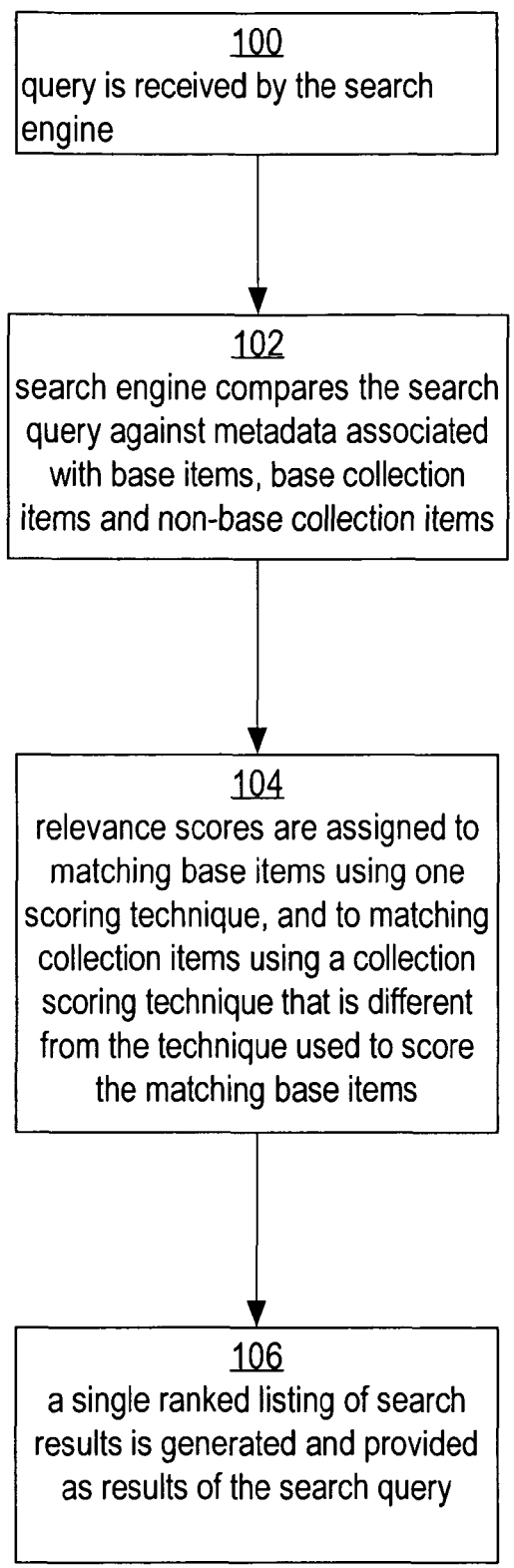
FIG. 1 is a flowchart illustrating steps for responding to a search query, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for including collection items in the ranked set of search results that are returned to a user in response to a search query. To return non-base collection items in the ranked set of search results, a search engine runs queries against both base items and non-base collection items. After base items and non-base collection items that match a query are identified, the search engine determines relevance scores for both the base items and the non-base collection items. By including matching non-base collection items in the same ranked set of search results that includes matching base items, a user is able to more easily determine the likelihood that a non-base collection item contains base items that would be of interest to the user. In addition, users are more likely to use non-base collection items to find the information they are seeking when non-base collection items are ranked highly in an integrated ranked set of search results, rather than presented separately from the base item rankings.

Collection scoring techniques are also provided for generating relevance scores for collection items in a different manner than relevance scores are generated for base items that are not collections. The collection scoring techniques may be applied to non-base collection items, base collection items, or both.

In one embodiment, the collection scoring techniques are based on a variety of factors, including characteristics of the base items that belong to the collection items, and characteristics of the collection items themselves. The characteristics of the base items that are used to determine the relevance score of a collection item may be the same characteristics that would be used to determine the relevance of the individual base items themselves. The characteristics of the collection items that may be used to determine the relevance score of the collection item may include, for example, information associated with the creator of the collection item, popularity of the collection item, etc.

When applied to base collection items, the collection scoring techniques may produce different relevancy rankings than would be produced by applying the standard base item scoring to base collection items. For example, the relevance score for a particular base collection item may be generated based, at least in part, on the relevance scores of the base items that are represented by the base collection item. The relevance score thus produced may be higher or lower than the relevance score that would have been produced by scoring the base collection item without taking into account that the base collection item represents a collection.

Collection Items

Various techniques shall be described hereafter for including collection items in search results for searches run against various types of base items. The techniques are not limited to any particular type of search, or any particular type of collection item. The following list of non-base collection items is provided for the purposes of illustration, and is not intended to be exhaustive:

Tags—each tag represents the collection of items that have been tagged with the given tag. Tags may be applied to any type of base item, including web pages, event records, songs, videos, etc.

Search—each search represents the collection of items that belong to the search results produced when the search is executed. Searches may be performed against any type of base item. A given search represents the collection of base items that are of the base type against which the search is executed. For example, a search that is executed against metadata associated with images represents the collection of images that would be produced by executing the search.

Bookmark sets—each bookmark set represents the collection of items for which the bookmark set has bookmarks. For example, if a particular user creates bookmarks to the user's favorite web pages, then the set of bookmarks created by the user represents the collection of those web pages.

Also See—an "also see" list represents a collection of items that are logically related to a given item. For example, an electronic encyclopedia may have a web page that describes a particular topic, and a list of "also see" links to web pages that contain encyclopedic content for related topics. The "also see" list is not itself a web page, but it represents the collection of web pages that contain those related topics.

Playlist—a playlist represents the collection of playable media items (e.g. songs, videos) that belong to the playlist.

Wish list—a wish list represents the collection of purchasable items that have been placed in the wish list.

Directories—a directory represents the collection of items that have been assigned to the category that corresponds to the directory. Various types of items have been categorized into directories. For example, various companies have created extensive directories of web sites to help users find information they seek.

Travel Itinerary—a travel itinerary represents a collection of travel items. The travel items may include, for example, ports of call, flights, car rentals, tours, etc.

Examples of base collection items include, but are not limited to folders (files that are able to contain other files) and collective web pages (web pages that represent collections of other web pages).

Registering Collection Items

To include collection items in search results, the index against which a search is performed must include information about the collection items, as well as information about the base items. As shall be described in greater detail hereafter, collection items are not treated by the search engine in the same manner as base items, with respect to scoring or presentation. Consequently, the search index includes an indication of which items are base items, and which items are collection items. In indexes that support multiple types of collection items, the index includes data that identifies the type of each collection item represented in the index.

A separate mechanism will typically have to be used to obtain the information about the collection items than is used to collect information about base items. For example, one technique for obtaining information about web pages involves "crawling the web" by following links between web pages. However, conventional web crawlers are not designed to obtain information about bookmark sets that users have created to access their favorite web pages. Consequently, a different mechanism must be used to gather information about bookmark sets, to enable bookmark sets to be included in the ranked results of web page searches.

Various types of mechanisms may be used to obtain information about non-base collection items. The present invention is not limited to any particular type of non-base collection item discovery mechanism. For example, non-base collection items may be explicitly registered with a search engine by the same mechanism that is used to create the non-base collection items. Thus, a web service that allows users to create and share bookmark sets may register such bookmark sets with a web page search engine. Similarly, a merchant web site that allows users to add items to wish lists may register those wish lists with a merchandise search engine. As yet another example, media playback software that allows users to define and share playlists of songs may be designed to register those playlists with a music search engine.

The explicit registration of a non-base collection item with a search engine may be automatic, or performed at the option of the user that created the non-base collection item. For example, a web site that allows users to create and share bookmark sets may provide a user interface control through which a user specifies whether the bookmark sets should be registered with a search engine. Further, even when a user has given permission for a non-base collection item to be registered with a search engine, the registration mechanism may apply additional criteria to determine whether the non-base collection item should be registered. For example, a site that allows users to create and share bookmark sets may also have a scoring mechanism for determining which bookmark sets are most useful. Under these circumstances, the site may only register with a search engine those bookmark sets that are associated with a usefulness score that exceeds a given threshold.

Instead of or in addition to an explicit registration mechanism, non-base collection items may be registered implicitly. For example, a discovery mechanism may be used to mine the directories of a directory system, and then register with a web-page search engine the directories thus discovered.

As another example, a discovery mechanism may be run against a repository of files to identify files that correspond to playlists, and then register any playlists that are discovered in this manner with a music search engine.

In an embodiment where the non-base collection items are themselves searches, the search engine that is used to perform web-page searches may register all searches that satisfy certain criteria. For example, the search engine may register all searches that are submitted to the search engine at a frequency that exceeds a certain threshold.

Registration Metadata

When a non-base collection item is registered with a search engine, the registration includes providing to the search engine information about the non-base collection item that enables the search engine to (a) determine whether the non-base collection item matches search criteria specified for base items, and (b) generate a relevance score for the non-base collection item by which the non-base collection item may be ranked relative to matching base items.

The information that is provided to a search engine during the registration of a non-base collection item is referred to herein as the "registration metadata" of the non-base collection item. The actual information contained in the registration metadata may vary from implementation to implementation, and may be based on the type of non-base collection item that is being registered. Examples of registration metadata include, but are not limited to:

- information that identifies the base items in the collection represented by the non-base collection item;
- information about the creator of the non-base collection item, such as an indication of the reputation of the creator, an indication of the interests of the creator, an indication of the expertise of the creator, an indication of the education of the creator, an indication of the affiliations of the creator, etc.
- information about the non-base collection item, such as a name assigned to the non-base collection item, tags that have been assigned to the non-base collection item, an indication of the popularity of the non-base collection item, an indication of the categories to which the non-base collection item belongs (e.g. the fact that a playlist is for country music, that a wish list is full of items required to set up the ultimate home theater, etc.).

Scoring Collection Items

Various scoring techniques shall be described hereafter for scoring collection items differently than non-collection items. The collection scoring techniques may be applied to both base collection items and non-base collection items.

The relevance score generated for collection items may be based on a variety of factors, including any or all of the registration metadata that is associated with the collection items. Such factors may include, but are not limited to (1) characteristics of the base items in the collection, (2) characteristics of the collection itself, and (3) characteristics of the creator of the collection. Each of the types of factors shall be described in greater detail below.

Collection Scoring Based on Characteristics of the Base Items that Belong to the Collection In one embodiment, the registration metadata includes information that identifies the base items in the collection represented by the collection item. Because the registration metadata identifies the base items that belong to the collection, the search engine is able to take characteristics of the base items into account when scoring the collection item. For example, one characteristic of the base items that may be used to score a collection is the individual relevance scores of the base items. For example, in one embodiment, generating a relevance score for a collection item includes (1) generating relevance scores for each of the base items that belong to the collection using a conventional base-item scoring technique, (2) determining an average relevance score of the base items that belong to the collection, and (3) generating a relevance score for the collection based, at least in part, on the average relevance score of the base items that belong to the collection.

Other examples of basing relevance score of a collection item on characteristics of the base items that belong to the collection item include:

- determining the relevance score of a playlist based on user ratings assigned to the songs in the playlist;
- determining the relevance score of a playlist based on download frequencies of the songs in the playlist;
- determining the relevance score of a playlist based on the average duration of the songs in the playlist;
- determining the relevance score of a wish list based on the number of sales of each of the items that are in the wish list;
- determining the relevance score of a wish list based on quality ratings that are associated with each of the items that are in the wish list;
- determining the relevance of a tag that has been assigned to events based on how many people have indicated that they plan to attend each of the events that has been assigned the tag;
- determining the relevance score of an itinerary based on the safety ratings associated with the countries included in the itinerary;
- determining the relevance score of an itinerary based on the popularity of the travel items on the itinerary; and
- determining the relevance score of a folder based on the modified dates associated with the items in the folder.

These examples are merely illustrative of how the relevance score of a collection item may be based on characteristics of the base items that belong to the collection item. The specific characteristics of the base items that are taken into account in determining the score of the collection item will vary from implementation to implementation, based in part on the nature of base items that belong to the collection.

Collection Scoring Based on Characteristics of the Collection

Instead of or in addition to taking into account characteristics of the base items that belong to a collection, the relevance score of a collection item may be generated based, at least in part, on characteristics of the collection item. Such characteristics may include both metadata explicitly assigned to the collection (e.g. name, tags, etc.), inherent characteristics of the collection (e.g. number of items in the collection, total duration of playlist, total cost of items in wish list, etc.), and metadata generated based on user behavior related to the collection (e.g. popularity, ratings, etc.). For example, a particular bookmark set may have received a high usefulness rating from bookmark set users. The usefulness rating of the bookmark set may be included in the registration metadata for the bookmark set, and may be used by the search engine when generating a relevance score to the bookmark set. Thus, high usefulness ratings will increase the relevance score of the bookmark set, while low usefulness ratings will decrease the relevance score of the bookmark set.

Other examples of basing relevance score of a collection item on characteristics of the collection item include:

- determining the relevance score of a playlist based on popularity of the playlist;
- determining the relevance score of a wish list based on how many people have added the contents of the wish list to their personal wish lists;
- determining the relevance score of a folder based on the modification data of the folder;
- determining the relevance of a tag that has been assigned to events based on how frequently the tag is assigned to events; and
- determining the relevance of a bookmark set based on categories to which the bookmark set has been assigned.

These examples are merely illustrative of how the relevance score of a collection item may be based on characteristics the collection item. The specific characteristics of collection items that are taken into account in determining the score of the collection items will vary from implementation to implementation, based in part on the nature of the collection item.

Collection Scoring Based on Characteristics of the Creator of the Collection

Instead of or in addition to taking into account characteristics of the base items that belong to a collection, and the characteristics of the collection item, the relevance score of a collection item may be generated based, at least in part, on characteristics of the creator of the collection item. For example, a particular user may have created many shared bookmark sets. Other users may have given high "usefulness" ratings to those bookmark sets. Consequently, the user may have been granted the rank of "authority" by the bookmark set web site. The fact that the creator of a bookmark set has been designated an "authority" may be used to increase the relevance score of a bookmark set created by the user, even when the score applies to a bookmark set that did not receive a high usefulness rating.

The characteristics of the collection item, and the characteristics of the creator of the collection item, may be stored within the search engine index, or dynamically determined at the time that a search engine is processing a query. For example, in response to determining that a particular bookmark set matches a query, the search engine may (1) identify the owner of the bookmark set, and (2) dynamically generate a reputation measure for the creator based on current information associated with the user. Similarly, the popularity measure of a collection item, such as a bookmark set, may be dynamically generated at the time a search query is being processed. By dynamically generating characteristics at the time that search queries are processed, the scoring of the collection can take into account events that have occurred since the collection items were registered with the search engine. For example, the popularity of a bookmark set, or the reputation of the creator of a bookmark set, may have changed significantly between the time the bookmark set is registered with the search engine, and the time that the bookmark set is selected as a matching item for a search query.

Other examples of basing relevance score of a collection item on characteristics of the creator of the collection item include:
- determining the relevance score of a playlist based on the age of the creator of the playlist (e.g. the smaller the difference between the age of the creator and the age of a searcher, the higher the relevance score assigned to the playlist);
- determining the relevance score of a wish list based on the income level of the creator of the wish lists;
- determining the relevance score of a folder based on the position, within a company, held by the creator of the folder;
- determining the relevance of a tag that has been assigned to events based on whether the creator of the tag is also the one who posted the events that are tagged with the tag;
- determining the relevance of a bookmark set based on whether the creator of the bookmark set has been identified as the source of spam;
- determining the relevance of a bookmark set based on a measure of expertise of the creator of the bookmark set,
- determining the relevance of a bookmark set based on a measure of the reputation of the creator of the bookmark set (where the reputation measure may be determined based, at least in part, on how early the creator bookmarked items that have subsequently been determined to be useful); and
- determining the relevance of a bookmark set based on the home-state of the creator of the bookmark set.

These examples are merely illustrative of how the relevance score of a collection item may be based on characteristics of the creator of the collection item. The specific characteristics of the creators of collection items that are taken into account in determining the score of the collection items will vary from implementation to implementation, based in part on the nature of the collection item.

Result Sets that Include Collection Items

According to one embodiment, after a search engine has identified the base items and collection items that matched a search, the search engine generates relevance scores for each of the matching items. The relevance scores for base items may be generated based on conventional scoring techniques, while the relevance scores for collection items are generated based on one or more of the factors described above. Once scores have been generated for the matching items, the matching items are ranked based on their respective relevance scores, and returned as a single ranked list of matching items. Using the techniques described herein, the ranked list may include base items, base collection items, and non-base collection items. Because the base items, the base collection items and the non-base collection items are all included in the same ranked set, a user can readily determine the relative relevance of the base items, the base collection items and the non-base collection items.

Presenting Collection Items in Search Results

Once a user has been presented a ranked set of search results that include collection items, the user may desire to select a collection item from the set. According to one embodiment, when the user selects a collection item listing from the search results, the user is presented with a web page that includes controls for accessing the individual items that belong to the collection item. In some cases, such a web page will exist at the time the collection item is registered with the search engine. Under those circumstances, the search results listing for the collection item may contain a link to that pre-existing web page.

However, in other cases, no such web page will exist at the time the collection is registered with the search engine. For example, at the time a playlist is registered with a search engine, there may not be a web page associated with the playlist. Similarly, at the time bookmark sets, itineraries or wish lists are registered with a search engine, there may not be web pages that correspond to the collection items. Various techniques may be used to enable the search engine to list and present collection item web pages under those circumstances.

According to one technique, at the time a collection item is registered with the search engine, the search engine generates a web page for the collection item if the collection item does not have its own web page. When such collection items are listed in search results, the search result listing includes a link which, when selected, retrieves the web page created by the search engine.

According to another technique, no web page is generated for a collection item at the time the collection item is registered with the search engine. Instead, the search engine includes in the search result listing a link which, when selected, causes the search engine to dynamically generate a web page for the selected collection item.

A search engine may be designed to generate web pages for certain types of collection items at the time the collection items are registered, and to dynamically construct web pages for other types of collection items when the collection items are selected from a search result listing. Thus, a search results listings generated using the techniques described herein may include any combination of:

- links to web pages associated with base items;
- links to pre-existing web pages associated with collection items;
- links to static web pages, created by the search engine, for collection items; and
- links which, when selected, cause the dynamic generation of web pages, by the search engine, for collection items.

According to one embodiment, collection items are displayed differently in the search results than base items. Specifically, the search engine may take advantage of the fact that more information, and more types of information, may be known about a collection than is known about a base item. For example, if the collection item is a bookmark set, then the search engine may know the creator of the bookmark set and the usefulness rating of the bookmark set. Consequently, the search engine may include, in the search result list entry for the bookmark set, an indication of the usefulness rating, the name of the creator, a photo of the creator, an indication of the reputation measure of the creator, etc.

Example Process

FIG. 1 is a block diagram illustrating steps for responding to a search query, according to an embodiment of the invention. At step 100, the query is received by the search engine. At step 102, the search engine compares the search query against metadata associated with base items, base collection items and non-base collection items to identify matching items. At step 104, the relevance scores are assigned to matching base items using one scoring technique, and to matching base collection items and matching non-base collection items using a collection scoring technique that is different from the technique used to score the matching base items. At step 106, a single ranked listing of search results is generated and provided as results of the search query. The ranked listing may include base items, base collection items and non-base collection items, ranked according to their respective relevance scores. As mentioned above, the list entries for non-base collection items may include links to pre-existing web pages, static web pages, or links that will cause the dynamic generation of a web page for the non-base collection item.

Hardware Overview

Figure 2:
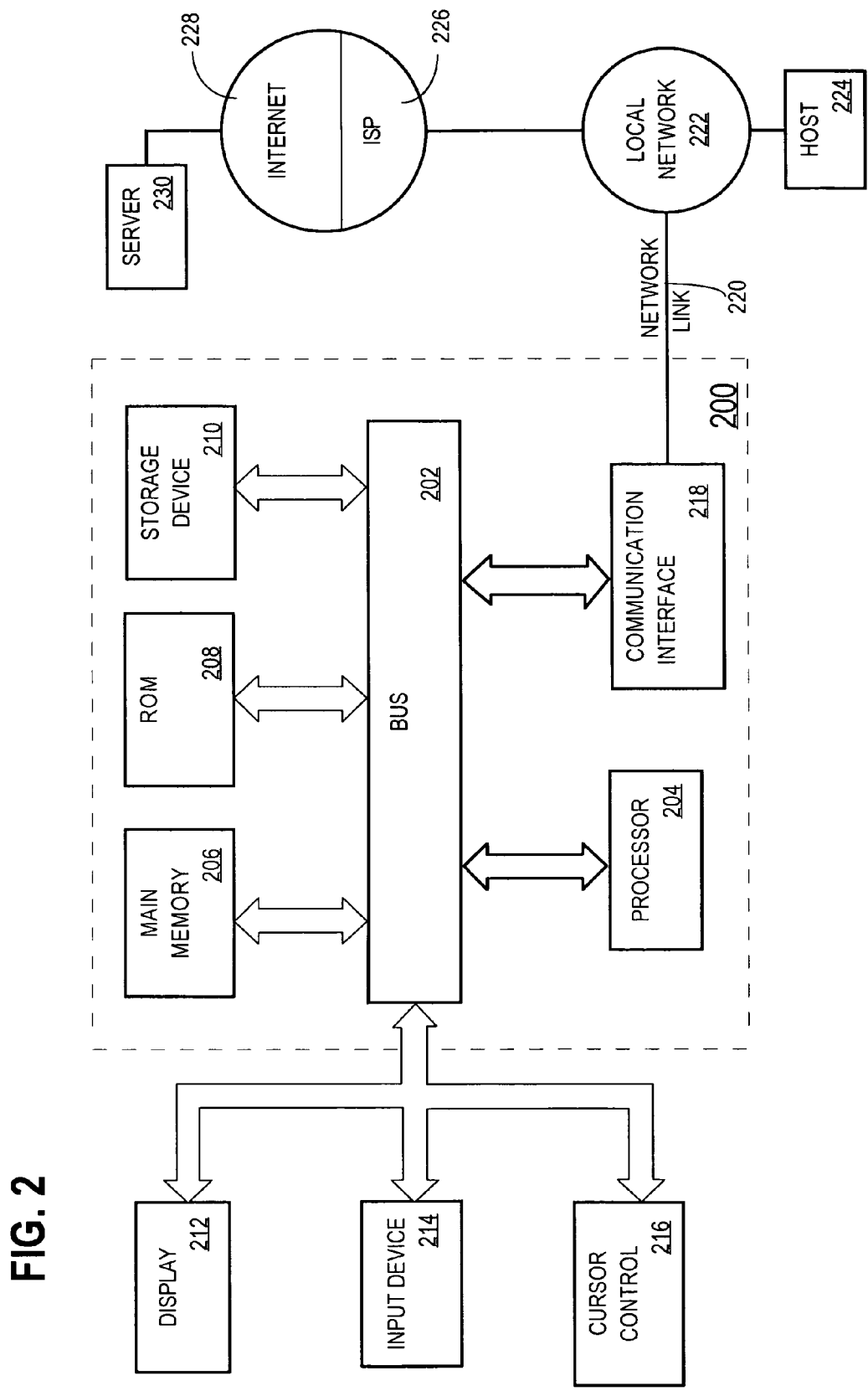
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   in response to receiving a search query executed against base items, identifying a particular set of matching items;
   wherein the particular set includes both: (a) one or more base items, and (b) one or more non-base collection items;
   wherein each non-base collection item represents a plurality of base items;
   determining a relevancy ranking for each matching item in the particular set relative to all other matching items in the particular set by generating a relevance score for each matching item in the particular set;
   wherein the one or more base items includes a first base item and a second base item;
   wherein the one or more non-base collection items includes a particular collection item;
   wherein the relevance score for the particular non-base collection item is based at least in part on which base items belong to a collection represented by the particular non-base collection item;
   wherein the relevance score for the first base item is higher than the relevance score for the particular non-base collection item;
   wherein the relevance score for the second base item is lower than the relevance score for the particular non-base collection item; and
   responding to said search query by providing first search results based on the particular set of matching items and the relevancy rankings, wherein providing search results includes providing a first ranked listing of matching items from said particular set, wherein said first ranked listing (a) includes said first base item, said second base item, and said particular collection item, and (b) is ordered based on said relevancy rankings;
   wherein the first ranked listing indicates a first position for the first base item, a second position for the particular collection item, and a third position for the second base item;
   wherein the method is performed by one or more computing devices.

2. The method of claim 1 wherein the base items are web pages and the non-base collection items are bookmark sets.

3. The method of claim 1 wherein the base items are web pages and the non-base collection items are searches.

4. The method of claim 1 wherein the base items are web pages and the non-base collection items are alternative search queries.

5. The method of claim 1 wherein the base items are audio files and the non-base collection items are playlists.

6. The method of claim 1 wherein the base items are merchandise and the non-base collection items are wish lists.

7. The method of claim 1 wherein the base items are web pages and the non-base collection items are directories.

8. The method of claim 1 wherein the base items are travel-related items and the non-base collection items are itineraries.

9. The method of claim 1 wherein the base items are tagged items and the non-base collection items are tags.

10. A method comprising:
    in response to receiving a search query executed against base items, identifying a particular set of matching items;
    wherein the particular set includes both: (a) one or more base items, and (b) one or more collection items;
    wherein each collection item represents a plurality of base items;
    wherein the one or more collection items includes a first item that is a collection item;
    wherein the one or more base items includes a second item that is a base item;
    determining a first relevance score for the first item using a first scoring technique;
    determining a second relevance score for the second item using a second scoring technique that is different than said first scoring technique; and
    responding to said search query by providing a ranked set of search results based on the particular set of matching items, wherein the ranked set of search results includes said first item and said second item;

wherein the first item and the second item are respectively ranked within said ranked set based on said first relevance score for the first item and said second relevance score for the second item;

wherein said first relevance score is generated for the first item using a first scoring technique that determines said first relevance score based, at least in part, on which base items belong to a collection represented by the collection item; and wherein the method is performed by one or more computing devices.

11. The method of claim 10 wherein the first item is a base collection item.

12. The method of claim 10 wherein the first item is a non-base collection item.

13. The method of claim 10 wherein the first scoring technique determines said first relevance score based, at least in part, on content of base items that belong to a collection represented by the first item.

14. The method of claim 10 wherein the first scoring technique determines said first relevance score based, at least in part, on information about a creator of said first item.

15. The method of claim 12 wherein the first scoring technique determines said first relevance score based, at least in part, on a popularity measure associated with said non-base collection item.

16. The method of claim 13 wherein the first scoring technique determines said first relevance score based, at least in part, on an average relevance score of the base items that belong to the collection represented by the first item.

17. The method of claim 10 wherein:
the step of providing a ranked set of search results includes providing a web page that has a link for said first item; and
the certain steps include, in response to selection of the link, dynamically generating a web page that includes controls for accessing base items that belong to the first item.

18. The method of claim 10 wherein:
the step of providing a ranked set of search results includes providing a web page that has a link for said first item; and
the certain steps include, in response to selection of the link, delivering a web page that was created, by the search engine, at the time the first item was registered with the search engine;
the web page includes controls for accessing base items that belong to the first item.

19. The method of claim 1, wherein:
the non-base collection items existed prior to receiving the search query; and
the specific set of base items that belong to each of the one or more non-base collection items is unaffected by the search query.

20. A machine-readable volatile or non-volatile medium storing instructions which, when executed by one or more processors, cause the processors to perform:
in response to receiving a search query executed against base items, identifying a particular set of matching items;
wherein the particular set includes both: (a) one or more base items, and (b) one or more non-base collection items;
wherein each non-base collection item represents a plurality of base items;

determining a relevancy ranking for each matching item in the particular set relative to all other matching items in the particular set by generating a relevance score for each matching item in the particular set;

wherein the one or more non-base collection items includes a particular collection item;

wherein the relevance score for the particular non-base collection item is based at least in part on which base items belong to a collection represented by the particular non-base collection item;

wherein the relevance score for the first base item is higher than the relevance score for the particular non-base collection item;

wherein the relevance score for the second base item is lower than the relevance score for the particular non-base collection item; and responding to said search query by providing first search results based on the particular set of matching items and the relevancy rankings, wherein providing search results includes providing a first ranked listing of matching items from said particular set, wherein said first ranked listing (a) includes said first base item, said second base item, and said particular collection item, and (b) is ordered based on said relevancy rankings;

wherein the first ranked listing indicates a first position for the first base item, a second position for the particular collection item, and a third position for the second base item.

21. The machine-readable volatile or non-volatile medium of claim 20 wherein the base items are web pages and the non-base collection items are bookmark sets.

22. The machine-readable volatile or non-volatile medium of claim 20 wherein the base items are web pages and the non-base collection items are searches.

23. The machine-readable volatile or non-volatile medium of claim 20 wherein the base items are web pages and the non-base collection items are alternative search queries.

24. The machine-readable volatile or non-volatile medium of claim 20 wherein the base items are audio files and the non-base collection items are playlists.

25. The machine-readable volatile or non-volatile medium of claim 20 wherein the base items are merchandise and the non-base collection items are wish lists.

26. The machine-readable volatile or non-volatile medium of claim 20 wherein the base items are web pages and the non-base collection items are directories.

27. The machine-readable volatile or non-volatile medium of claim 20 wherein the base items are travel-related items and the non-base collection items are itineraries.

28. The machine-readable volatile or non-volatile medium of claim 20 wherein the base items are tagged items and the non-base collection items are tags.

29. The machine-readable volatile or non-volatile medium of claim 20 wherein:
the non-base collection items existed prior to receiving the search query; and
the specific set of base items that belong to each of the one or more non-base collection items is unaffected by the search query.

30. A machine-readable volatile or non-volatile medium storing instructions which, when executed by one or more processors, cause the processors to perform:
in response to receiving a search query executed against base items, identifying a particular set of matching items;
wherein the particular set includes both: (a) one or more base items, and (b) one or more collection items;

wherein each collection item represents a plurality of base items;

wherein the one or more collection items includes a first item that is a collection item;

wherein the one or more base items includes a second item that is a base item;

determining a first relevance score for the first item using a first scoring technique;

determining a second relevance score for the second item using a second scoring technique that is different than said first scoring technique; and responding to said search query by providing a ranked set of search results based on the particular set of matching items, wherein the ranked set of search results includes said first item and said second item;

wherein the first item and the second item are respectively ranked within said ranked set based on said first relevance score for the first item and said second relevance score for the second item;

wherein said first relevance score is generated for the first item using a first scoring technique that determines said first relevance score based, at least in part, on which base items belong to a collection represented by the collection item.

31. The machine-readable volatile or non-volatile medium of claim 30 wherein the first item is a base collection item.

32. The machine-readable volatile or non-volatile medium of claim 30 wherein the first item is a non-base collection item.

33. The machine-readable volatile or non-volatile medium of claim 30 wherein the first scoring technique determines said first relevance score based, at least in part, on content of base items that belong to a collection represented by the first item.

34. The machine-readable volatile or non-volatile medium of claim 30 wherein the first scoring technique determines said first relevance score based, at least in part, on information about a creator of said first item.

35. The machine-readable volatile or non-volatile medium of claim 32 wherein the first scoring technique determines said first relevance score based, at least in part, on a popularity measure associated with said non-base collection item.

36. The machine-readable volatile or non-volatile medium of claim 33 wherein the first scoring technique determines said first relevance score based, at least in part, on an average relevance score of the base items that belong to the collection represented by the first item.

37. The machine-readable volatile or non-volatile medium of claim 30 wherein:

the step of providing a ranked set of search results includes providing a web page that has a link for said first item; and the certain steps include, in response to selection of the link, dynamically generating a web page that includes controls for accessing base items that belong to the first item.

38. The machine-readable volatile or non-volatile medium of claim 30 wherein:

the step of providing a ranked set of search results includes providing a web page that has a link for said first item; and the certain steps include, in response to selection of the link, delivering a web page that was created, by the search engine, at the time the first item was registered with the search engine;

the web page includes controls for accessing base items that belong to the first item.

* * * * *